(12) United States Patent
Wakao

(10) Patent No.: US 7,139,407 B2
(45) Date of Patent: Nov. 21, 2006

(54) IMAGE GENERATION APPARATUS, IMAGE FILE GENERATION METHOD, IMAGE VERIFICATION APPARATUS AND IMAGE VERIFICATION METHOD

(75) Inventor: Satoru Wakao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/316,878

(22) Filed: Dec. 12, 2002

(65) Prior Publication Data
US 2003/0123700 A1 Jul. 3, 2003

(30) Foreign Application Priority Data
Dec. 28, 2001 (JP) ............................. 2001-401662

(51) Int. Cl.
G06K 9/00 (2006.01)
G06K 15/00 (2006.01)
H04N 5/76 (2006.01)
H04L 9/00 (2006.01)
H04K 1/00 (2006.01)

(52) U.S. Cl. ................ 382/100; 348/231.5; 348/231.6; 358/3.28; 380/44; 380/282; 705/51; 713/176

(58) Field of Classification Search ................ 382/100; 348/231.2, 231.3, 231.5, 231.6; 358/3.28, 358/426.12, 434; 380/44–47, 277–282; 705/51; 713/176–181
See application file for complete search history.

(56) References Cited

U.S. PATENT DOCUMENTS

| | | | | |
|---|---|---|---|---|
| 5,005,200 A | * | 4/1991 | Fischer ...................... | 380/30 |
| 5,499,294 A | | 3/1996 | Friedman .................... | 380/10 |
| 5,708,714 A | * | 1/1998 | Lopez et al. ................ | 713/180 |
| 5,862,218 A | * | 1/1999 | Steinberg ................... | 713/176 |
| 6,005,936 A | * | 12/1999 | Shimizu et al. ............. | 713/176 |
| 6,665,420 B1 | * | 12/2003 | Xie et al. ................... | 713/176 |
| 6,671,407 B1 | * | 12/2003 | Venkatesan et al. ........ | 382/232 |
| 7,003,667 B1 | * | 2/2006 | Slick et al. ................. | 713/182 |
| 2002/0001395 A1 | * | 1/2002 | Davis et al. ................ | 382/100 |
| 2002/0051577 A1 | * | 5/2002 | Kinjo ......................... | 382/218 |

(Continued)

FOREIGN PATENT DOCUMENTS

JP 9-200730 7/1997

Primary Examiner—Andrew W. Johns
Assistant Examiner—Anthony Mackowey
(74) Attorney, Agent, or Firm—Fitzpatrick, Cella, Harper & Scinto

(57) ABSTRACT

An image generation apparatus includes an image file generating unit operable in one of first, second and third modes, wherein (a) if the first mode is selected, the image file generating unit generates a first image file including image data and first verirfication data used to verify whether the image data is falsified or not, (b) if the second mode is selected, the image file generating unit generates a second image file including the image data, additional information of the image data and second verification data used to verify whether the additional information is falsified or not, and (c) if the third mode is selected, the image file generating unit generates a third image file including the image data, the additional information, the first verification data and the second verification data. A selector is adapted to select one of the first, second and third modes, and a verification data generating unit is adapted to generate the first verification data using secret information and the image data and to generate the second verification data using the secret information and the additional information, and the additional information includes information relating to the image data.

12 Claims, 3 Drawing Sheets

U.S. PATENT DOCUMENTS

2002/0114454 A1* 8/2002 Hamilton .................... 380/200
2002/0191090 A1* 12/2002 Safai .......................... 348/239

* cited by examiner

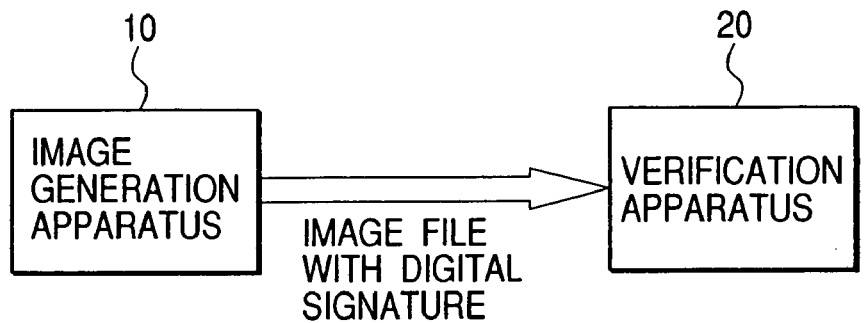
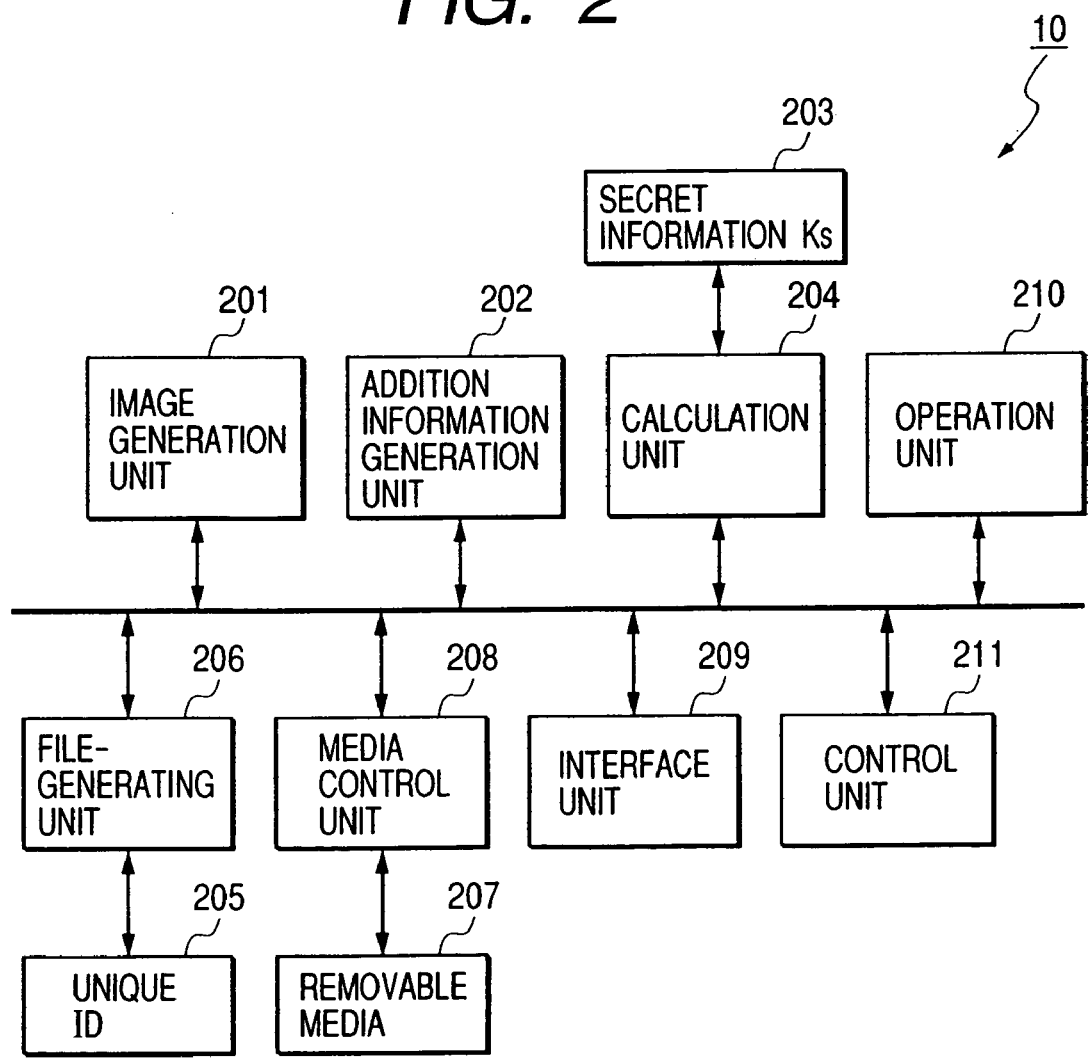

IMAGE GENERATION APPARATUS, IMAGE FILE GENERATION METHOD, IMAGE VERIFICATION APPARATUS AND IMAGE VERIFICATION METHOD

BACKGROUND OF THE INVENTION

1. Field of the Invention

The present invention relates to an image generation apparatus, an image file generation method, an image verification apparatus, an image verification method and the like, capable of verifying whether addition information of an image data was falsified.

2. Related Background Art

Digital cameras are in practical use nowadays to digitalize an optical image of a subject and store it.

Although image data photographed with a digital camera can be easily loaded in a personal computer, there is a problem that the image data can also be falsified easily on the personal computer. Reliability of image data photographed with a digital camera is therefore lower than that of a silver salt photograph, resulting in an insufficient admissibility. To avoid this, a digital camera system has recently been proposed which has the function of adding a digital signature to image data photographed with a digital camera. Conventional digital camera systems are disclosed, e.g., in U.S. Pat. No. 5,499,294 and Japanese Patent Application Laid-Open No. 9-200730.

A conventional digital camera system is, however, associated with a problem that a digital signature or Message Authentication Codes (MAC) of image data cannot be created independently from a digital signature or MAC of addition information of image data. It is therefore impossible to independently verify whether image data was falsified and whether addition information was falsified. A user cannot distinguish among whether image data was falsified, whether addition information of image data was falsified, and whether the image data and addition information were falsified.

SUMMARY OF THE INVENTION

An object of the invention is to solve the above-described problems.

Another object of the present invention solving the above-described problems is to provide an image generation apparatus, an image file generation method, a verification apparatus, an image verification method, a program and a storage medium, capable of independently verifying verification data (digital signature, MAC or the like) of image data and addition information of the image data to identify which data or information was falsified.

An image generation apparatus according to a prefefred embodiment of the invention comprises an image file generating unit operable in one of first, second and third modes, wherein (a) if the first mode is selected, the image file generating unit generates a first image file including image data and first verification data used to verify whether the image data is falsified or not, (b) if the second mode is selected, the image file generating unit generates a second image file including the image data, additional information of the image data and second verification data used to verify whether the additional information is falsified or not, and (c) if the third mode is selected, the image file generating unit generates a third image file including the image data, the additional information, the first verification data and the second verification data. A selector is adapted to select one of the first, second and third modes, and a verification data generating unit is adapted to generate the first verification data using secret information and the image data and generates the second verification data using the secret information and the additional information, wherein the additional information includes information relating to the image data.

An image generation apparatus according to a preferred embodiment of the invention comprises a verification unit operable in one of first, second and third modes, wherein (a) if the first mode is selected, the verification unit verifies, using first verification data, whether image data is falsified or not, (b) if the second mode is selected, the verification unit verifies, using second verification data, whether additional information of the image data is falsified or not, and (c) if the third mode is selected, the verification unit verifies, using the first verification data, whether the image is falsified or not, and verifies, using the second verification data, whether the additional information is falsified or not. A selector adapted to select one of the first, second and third modes, the first verification data is generated using secret information and the image data, wherein the second verification data is generated using the secret information and the additional information, and the additional information includes information relating to the image data.

Still other objects of the present invention, and the advantages thereof, will become fully apparent from the following detailed description of the embodiments.

BRIEF DESCRIPTION OF THE DRAWINGS

FIG. 1 is a diagram illustrating an example of the structure of an image verification system according to an embodiment.

FIG. 2 is a block diagram illustrating the main functional structure of an image generation apparatus 10 of the embodiment.

DESCRIPTION OF THE PREFERRED EMBODIMENTS

Figure 3:
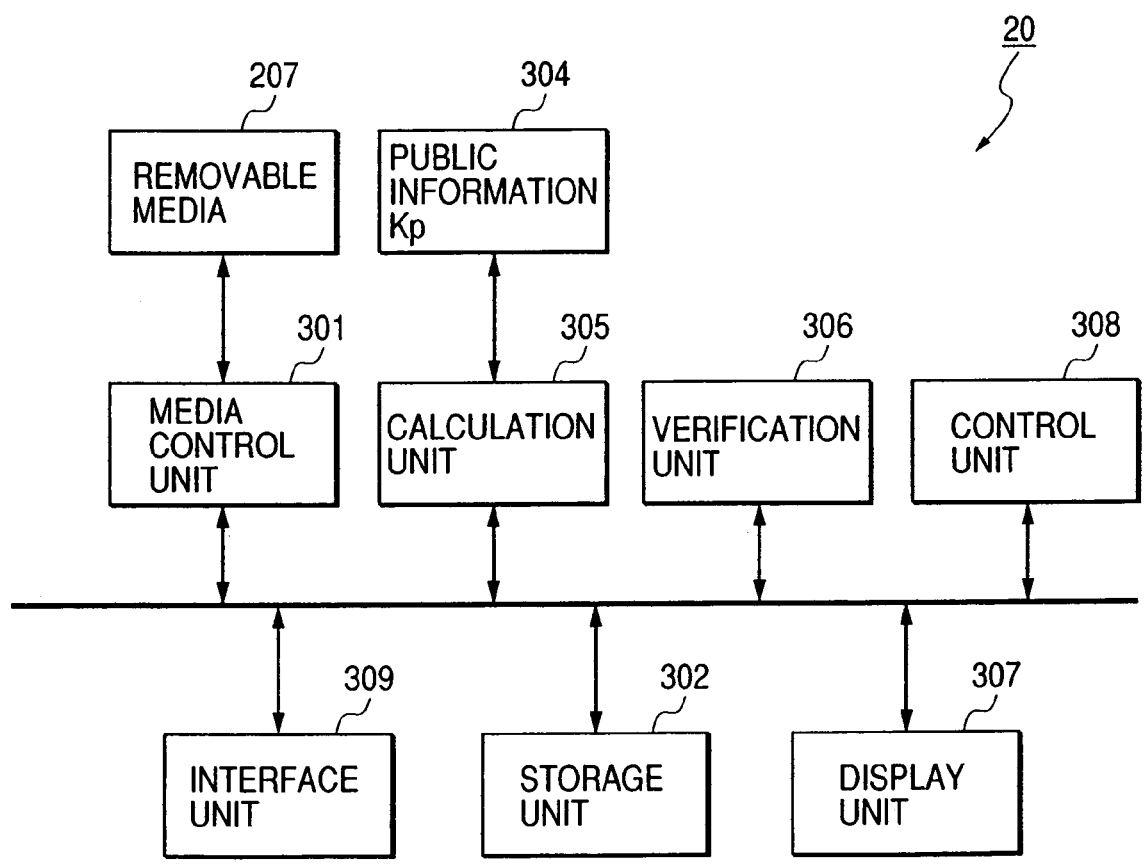
FIG. 3 is a block diagram illustrating the main functional structure of a verification apparatus 20 of the embodiment.

Preferred embodiments of the invention will be described with reference to the accompanying drawing.

FIG. 1 is a diagram illustrating an example of the structure of an image verification system according to a first embodiment. In the first embodiment, a digital signature of image data is used as verification data necessary for verifying whether image data was falsified.

An image generation apparatus 10 has a function of generating image data of a subject and a function of executing a signature mode A, B or C.

In the signature mode A, an image file having a digital signature of a first type is generated (hereinafter called an image file A). An image file A contains data such as image data, addition information of the image data, a digital signature for the image data and a peculiar ID of the image generation apparatus 10.

In the signature mode B, an image file having a digital signature of a second type is generated (hereinafter called an image file B). An image file B contains data such as image data, addition information of the image data, a digital signature for the addition information and the peculiar ID of the image generation apparatus 10.

In the signature mode C, an image file having a digital signature of a third type is generated (hereinafter called an image file C). An image file C contains data such as image data, addition information of the image data, a digital signature for the image data, a digital signature of the addition information and the peculiar ID of the image generation apparatus 10.

The image generation apparatus 10 may be an image pickup apparatus such as a digital camera, a digital video camera and a scanner, or an apparatus with a camera unit. Alternatively, it may be an apparatus such as a facsimile apparatus and a copy apparatus with an image reading unit.

A verification apparatus 20 has a function of executing a verification mode A, B or C.

In the verification mode A, it is verified whether image data was falsified. In the verification mode A, the verification apparatus 20 can verify image data of the image file A or C.

In the verification mode B, it is verified whether addition information of the image data was falsified. In the verification mode B, the verification apparatus 20 can verify addition information of the image file B or C.

In the verification mode C, it is verified whether image data was falsified and whether addition information of the image data was falsified. In the verification mode C, the verification apparatus 20 can verify image data and addition information of the image file C.

The verification apparatus 20 may be an information processing apparatus such as a personal computer.

FIG. 2 is a block diagram illustrating the main functional structure of the image generation apparatus 10 of the embodiment.

In FIG. 2, reference numeral 201 represents an image generation unit for generating image data I of a subject, the image generation unit having a micro processor and the like for controlling an optical system and an optical sensor such as charge coupled devices (CCDs).

Reference numeral 202 represents an addition information generation unit for generating addition information to be added to the image data I. This addition information contains information on the image data I and/or information on the image generation apparatus 10. Specifically, the addition information includes a date (year, month, day and time) when the image data I is generated, a data size of image data, a contrast, a distance to the subject, a shutter speed, an aperture value, a manufacture number, information on a lens unit, presence/absence of an electronic flush, a photometry method, an exposure control method, an owner, a version of firmware, and the like.

Reference numeral 203 represents a memory for storing secret information Ks. This secret information Ks corresponds to information on a secret key of a public key cryptographic scheme (such as RSA cryptographic scheme).

Reference numeral 204 represents a calculation unit which executes first and second calculation processes. The first calculation process generates a Hash value (also called a message digest or digest data) H11 of image data I by using a Hash function HF. The second calculation process converts the Hash value H11 generated by the first calculation process into a digital signature A, by using secret information Ks read from the memory 203. The first and second calculation processes are executed while the image generation apparatus 10 is in the signature mode A or C.

The calculation unit 204 also executes third and fourth calculation processes. The third calculation process generates a Hash value H21 of addition information of the image data I by using the Hash function HF. The fourth calculation process converts the Hash value H21 generated by the third calculation process into a digital signature B, by using the secret information Ks read from the memory 203. The third and fourth calculation processes are executed while the image generation apparatus 10 is in the signature mode B or C.

The Hash function HF may be any one of MD-2, MD-5, SHA-1, RIPEMD-128 and RIPEMD-160 or another Hash function.

Reference numeral 205 represents a memory for storing the peculiar ID (such as a manufacture number and a serial number of the image generation apparatus 10) which is information specific to the image generation apparatus.

Reference numeral 206 represents an image file generation unit for generating the image file A, B or C. The file format of each image file may be any one of a JPEG File Interchange Format (JFIF), a Tagged Image File Format (TIFF) and a Graphics Interchange Format (GIF) or another image file format.

Reference numeral 207 represents a removable storage medium for storing the image files A, B and C. The removable storage medium 207 may be a magnetic disk, an optical disk, a memory card or the like.

Reference numeral 208 represents a media control unit having a function of writing the image file A, B or C into the removable medium 207 and a function of reading the image file A, B or C from the removable medium 207.

Reference numeral 209 represents an interface unit having a function of transmitting the image file A, B or C stored in the removable medium 207 to the verification apparatus 20.

Reference numeral 210 represents an operation unit having switches for instructing to generate image data of a subject, photograph the subject, and read the image data, selection switches for selecting one of the signature modes A, B and C and the like. The selection switches may be realized by a graphical user interface such as a menu screen Reference numeral 211 represents a control unit for controlling the operation of each portion of the image generation apparatus 10. The control unit 211 has a memory and a micro computer for executing a control program stored in the memory. The memory of the control unit 211 stores the control program to control the procedure to be executed by the image generation apparatus 10 to be described with reference to FIG. 4.

FIG. 3 is a block diagram illustrating the main functional structure of a verification apparatus 20 of the embodiment.

Reference numeral 301 represents a media control unit having a function of reading the image file A, B or C from the removable medium 207.

Reference numeral 309 represents an interface unit having a function of receiving the image file A, B or C transmitted from the image generation apparatus 10.

Reference numeral 302 represents a storage unit for storing the image file A, B or C supplied from the media control unit 301 or interface unit 309.

Reference numeral 304 represents a memory for storing a plurality of peculiar IDs and public information Kp corresponding to each peculiar ID. The public information Kp corresponds to the secret information Ks and to the public ky of the public key cryptographic scheme (such as RSA cryptographic scheme).

Reference numeral 305 represents a calculation unit which executes first and second calculation processes. The first calculation process converts the digital signature A into a Hash value H12 by using the public information Kp. The second calculation process generates a Hash value H13 of the image data I by using the Hash function HF. The first and second calculation processes are executed while the verification apparatus 20 is in the signature mode A or C.

The calculation unit 305 also executes third and fourth calculation processes. The third calculation process converts the digital signature B into a Hash value H22 by using the public information Kp. The fourth calculation process generates a Hash value H23 of addition information of the image data I by using the Hash function HF. The third and fourth calculation processes are executed while the verification apparatus 20 is in the signature mode B or C.

Reference numeral 306 represents a verification unit having a function of verifying image data I and/or addition information of the image data I. In the verification mode A of the verification apparatus 20, the verification unit 306 verifies the image data I contained in the image file A or C. In the verification mode B of the verification apparatus 20, the verification unit 306 verifies addition information of the image data I contained in the image file B or C. In the verification mode C of the verification apparatus 20, the verification unit 306 verifies independently the image data contained in the image file I and the addition information of the image data I.

Reference numeral 307 represents a display unit for displaying information representative of verification results given by the verification unit 306.

Reference numeral 308 represents a control unit for controlling the operation of each portion of the verification apparatus 20. The control unit 308 has a memory and a micro computer for executing a control program stored in the memory. The memory of the control unit 308 stores the control program to control the procedure to be executed by the verification apparatus 20 to be described with reference to FIG. 4.

Figure 4:
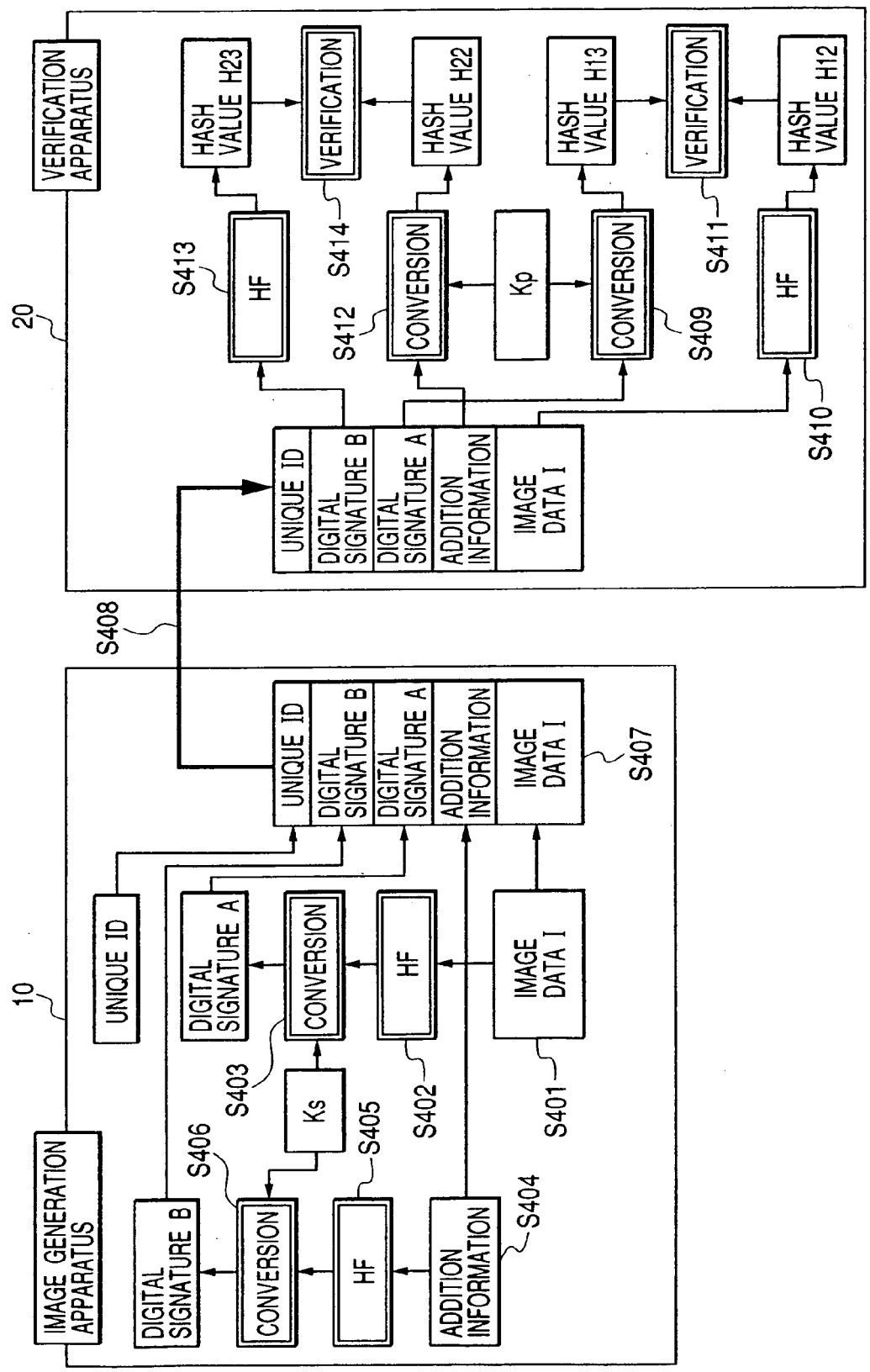
FIG. 4 is a block diagram illustrating the procedure to be performed by the image verification system of the embodiment.

FIG. 4 is a block diagram illustrating the procedure to be performed by the image verification system of the embodiment.

Step S401: In response to a user operation, the image generation unit 201 generates image data I of a subject. If the image generation apparatus 10 is in the signature mode A or C, the image data I is supplied to the calculation unit 204 and image file generation unit 206. If the image generation apparatus 10 is in the signature mode B, the image data I is supplied to the image file generation unit 206.

Step S402: The calculation unit 204 generates the Hash value H11 of the image data I by using the Hash function HF. This Step is not executed if the image generation apparatus 10 is in the signature mode B.

Step S403: The calculation unit 204 converts the Hash value H11 into the digital signature A by using the secret information Ks stored in the memory 203. The calculation unit 204 supplies the digital signature A to the image file generation unit 206. This Step is not executed if the image generation apparatus 10 is in the signature mode B.

Step S404: The addition information generation unit 202 generates addition information of the image data I. If the image generation apparatus 10 is in the signature mode A, the addition information of the image data I is supplied to the image file generation unit 206. If the image generation apparatus 10 is in the signature mode B or C, the addition information of the image data I is supplied to the calculation unit 204 and image file generation unit 206.

Step S405: The calculation unit 204 generates the Hash value H21 of the image data I by using the Hash function HF. This Step is not executed if the image generation apparatus 10 is in the signature mode A.

Step S406: The calculation unit 204 converts the Hash value H21 into the digital signature B by using the secret information Ks stored in the memory 203. This Step is not executed if the image generation apparatus 10 is in the signature mode A.

Step S407: The image file generation unit 206 generates the image file A, B or C. If the image generation apparatus 10 is in the signature mode A, the image file generation unit 206 generates the image file A. This image file A contains data such as the image data I, digital signature A, addition information of the image data I and peculiar ID of the image generation apparatus 10. If the image generation apparatus 10 is in the signature mode B, the image file generation unit 206 generates the image file B. This image file B contains data such as the image data I, digital signature B, addition information of the image data I and peculiar ID of the image generation apparatus 10. If the image generation apparatus 10 is in the signature mode C, the image file generation unit 206 generates the image file C. This image file C contains data such as the image data I, digital signature A, addition information of the image data I, digital signature B and peculiar ID of the image generation apparatus 10. The image file A, B or C generated by the image file generation unit 206 is written in the removable medium 207.

Step S408: The user inputs the image file A, B or C stored in the removable medium 207 to the verification apparatus 20 via the removable medium 207 or interface unit 209. If the image file is to be input via the removal medium 207, the media control unit 301 reads the image file A, B or C from the removable medium 207 and stores it in the storage unit 302. If the image file is to be input via the interface unit 209, the interface unit 209 receives the image file A, B or C transmitted from the image generation apparatus 10 and stores it in the storage unit 302.

Step S409: If the verification apparatus 20 is in the verification mode A or C, the verification apparatus 20 executes the processes from Step S409 to Step S411. First, the calculation unit 305 derives the image data I, peculiar ID and digital signature A from the image file A or C, and acquires the public information Kp corresponding to the peculiar ID from the memory 304. Next, the calculation unit 305 converts the digital signature A into the Hash value H12 by using the public information Kp acquired from the memory 304.

Step S410: The calculation unit 305 generates the Hash value H13 of the image data I by using the Hash function HF.

Step S411: The verification unit 306 compares the Hash value H12 obtained at Step S409 with the Hash value H13 obtained at Step S410 to thereby verify whether the image data I was falsified.

If the two Hash values are equal (i.e., perfectness of the image data I can be verified correctly), the verification unit 306 detects that the image data I was not falsified. At the same time, the verification unit 306 detects that the image data I was generated at the image generation apparatus 10. The verification apparatus 20 displays on the display unit 307 the information representative of that the image data I was not falsified.

If the two Hash values are not equal (i.e., perfectness of the image data I cannot be verified correctly), the verification unit 306 detects that the image data I was falsified. The verification apparatus 20 displays on the display unit 307 the information representative of that the image data I was falsified.

Step S412: If the verification apparatus 20 is in the verification mode B or C, the verification apparatus 20 executes the processes from Step S412 to Step S414. First, the calculation unit 305 derives the addition information of the image data I, peculiar ID and digital signature B from the image file A or C, and acquires the public information Kp corresponding to the peculiar ID from the memory 304. Next, the calculation unit 305 converts the digital signature B into the Hash value H22 by using the public information Kp acquired from the memory 304.

Step S413: The calculation unit 305 generates the Hash value H23 of the image data I by using the Hash function HF.

Step S414: The verification unit 306 compares the Hash value H22 obtained at Step S412 with the Hash value H23 obtained at Step S413 to thereby verify whether the addition information of the image data I was falsified.

If the two Hash values are equal (i.e., perfectness of the addition information of the image data I can be verified correctly), the verification unit 306 detects that the addition information of the image data I was not falsified. At the same time, the verification unit 306 detects that the addition information of the image data I was generated at the image generation apparatus 10. The verification apparatus 20 displays on the display unit 307 the information representative of that the addition information of the image data I was not falsified.

If the two Hash values are not equal (i.e., perfectness of the addition information of the image data I cannot be verified correctly), the verification unit 306 detects that the addition information of the image data I was falsified. The verification apparatus 20 displays on the display unit 307 the information representative of that the addition information of the image data I was falsified.

As described above, according to the image verification system of this embodiment, it is possible to create the image file which contains the digital signature of image data and/or the digital signature of addition information. It is therefore possible to independently verify whether the image data was falsified and whether the addition information was falsified.

Furthermore, according to the image verification system of this embodiment, it is possible to create the image file which contains the digital signature of image data and/or the digital signature of addition information. It is therefore possible to distinguish between whether the image data was falsified, whether the addition information was falsified, and whether the image data and addition information were falsified.

In this embodiment, the image verification system has been described which uses the digital signature of image data and/or the digital signature of addition information as the verification data of the image data and/or addition information. The invention is applicable to other different systems. For example, the invention is applicable to the system which uses MAC (Message Authentication Codes) of image data and/or MAC of addition information as the verification data of the image data and/or addition information. In this case, the secret information Ks corresponds to a common key of the common key cryptographic scheme which is necessary for generation and verification of MAC. Since calculations necessary for generation and verification of verification data become simple, the process speed of the system can be speeded up and the system cost can be lowered.

The embodiment may be realized by making a computer to execute program codes providing the embodiment functions. Embodiments of the invention may include means for supplying such program codes to a computer, e.g., a storage medium such as a CD-ROM storing such program codes, a transmission medium such as the Internet transmitting such program codes, and the like. The program codes, recording media and transmission media are intended to fall within the scope of the invention. Storage media may be a flexible disk, a hard disk, an optical disk, a magneto optical disk, a CD-ROM, a magnetic tape, a non-volatile memory card, a ROM and the like.

The above-described embodiments are merely exemplary of this invention, and are not to be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. An image generation apparatus comprising:
an image file generating unit operable in one of first, second and third modes, wherein (a) if the first mode is selected, said image file generating unit generates a first image file including image data and first verification data used to verify whether the image data is falsified or not, (b) if the second mode is selected, said image file generating unit generates a second image file including the image data, additional information of the image data and second verification data used to verify whether the additional information is falsified or not, and (c) if the third mode is selected, said image file generating unit generates a third image file including the image data, the additional information, the first verification data and the second verification data;
a selector adapted to select one of the first, second and third modes; and
a verification data generating unit adapted to generate the first verification data using secret information and the image data, and to generate the second verification data using the secret information and the additional information,
wherein the additional information includes information relating to the image data.

2. An apparatus according to claim 1, wherein the additional information also includes information regarding the image generation apparatus.

3. An apparatus according to claim 1, wherein the first verification data is a digital signature of the image data, and
wherein the second verification data is a digital signature of the additional information.

4. An apparatus according to claim 1, wherein the first verification data is a message authentication code of the image data, and
wherein the second verification data is a message authentication code of the additional information.

5. An apparatus according to claim 1, wherein the image generation apparatus is one of a digital camera and a digital video camera.

6. An apparatus according to claim 1, wherein the image generation apparatus is one of a scanner, a facsimile apparatus and a copier.

7. An image verification apparatus comprising:
a verification unit operable in one of first, second and third modes, wherein (a) if the first mode is selected, said verification unit verifies, using first verification data, whether image data is falsified or not, (b) if the second mode is selected, said verification unit verifies, using second verification data, whether additional information of the image data is falsified or not, and (c) if the third mode is selected, said verification unit verifies, using the first verification data, whether the image is falsified or not, and verifies, using the second verification data, whether the additional information is falsified or not; and a selector adapted to select one of the first, second and third modes, wherein the first verification data is generated using secret information and the image data, wherein the second verification data is generated using the secret information and the additional information, and wherein the additional information includes information relating to the image data.

8. An apparatus according to claim 7, wherein if one of the first and third modes is selected, said verification unit verifies, using public information and the first verification data, whether the image data is falsified or not.

9. An apparatus according to claim 7, wherein if one of the second and third modes is selected, said verification unit verifies, using public information and the second verification data, whether the additional information is falsified or not.

10. An apparatus according to claim 7, wherein the additional information also includes information regarding an apparatus which generates the image file.

11. An apparatus according to claim 7, wherein the first verification data is a digital signature of the image data, and wherein the second verification data is a digital signature of the additional information.

12. An apparatus according to claim 7, wherein the first verification data is a message authentication code of the image data, and wherein the second verification data is a message authentication code of the additional information.

* * * * *